United States Patent
Kriele

(10) Patent No.: US 10,948,433 B2
(45) Date of Patent: Mar. 16, 2021

(54) DEVICE FOR CLAMPING AND CONTROLLING THE TEMPERATURE OF PLANAR SAMPLES FOR X-RAY DIFFRACTOMETRY

(71) Applicant: Helmholtz-Zentrum Geesthacht Zentrum für Material—und Küstenforschung GmbH, Geesthacht (DE)

(72) Inventor: Armin Kriele, Munich (DE)

(73) Assignee: Helmholtz-Zentrum Geesthacht Zentrum Für Material—und Küstenforschung GmbH

( * ) Notice: Subject to any disclaimer, the term of this patent is extended or adjusted under 35 U.S.C. 154(b) by 0 days.

(21) Appl. No.: 16/630,879

(22) PCT Filed: Sep. 4, 2018

(86) PCT No.: PCT/EP2018/073727
§ 371 (c)(1),
(2) Date: Jan. 14, 2020

(87) PCT Pub. No.: WO2019/057484
PCT Pub. Date: Mar. 28, 2019

(65) Prior Publication Data
US 2020/0150061 A1      May 14, 2020

(30) Foreign Application Priority Data
Sep. 21, 2017   (EP) ..................................... 17192263

(51) Int. Cl.
*G01N 23/20033*     (2018.01)
*H01M 10/613*       (2014.01)
(Continued)

(52) U.S. Cl.
CPC .. *G01N 23/20033* (2013.01); *H01M 10/0525* (2013.01); *H01M 10/4285* (2013.01);
(Continued)

(58) Field of Classification Search
CPC ....................... G01N 23/20033; H01M 10/613
See application file for complete search history.

(56) References Cited

U.S. PATENT DOCUMENTS

| | | | |
|---|---|---|---|
| 2015/0071409 A1 | 3/2015 | Gautsch et al. | |
| 2017/0141443 A1 | 5/2017 | Herklotz et al. | |

(Continued)

FOREIGN PATENT DOCUMENTS

| | | |
|---|---|---|
| DE | 102014211901 B3 | 3/2015 |
| JP | 6-102208 A | 4/1994 |
| JP | 6-118039 A | 4/1994 |

OTHER PUBLICATIONS

European communication dated Nov. 2, 2017 in corresponding European patent application No. 17192263.6.
(Continued)

*Primary Examiner* — Edwin C Gunberg
(74) *Attorney, Agent, or Firm* — Nields, Lemack & Frame, LLC

(57) ABSTRACT

The invention relates to an apparatus (1) for clamping flat samples (6), in particular pouch battery cells, for x-ray diffractometry, wherein the apparatus has a housing (2) having a sample holder (4), which has holding elements (5) that are able to be tensioned in relation to one another for clamping the sample (6), at least two x-ray windows (11*a*, 11*b*, 12) for letting in and out x-rays, and at least one first temperature control device (7) for controlling the temperature of the sample (6). At least one first temperature control device (7) is in each case attached to the holding elements (5), wherein the first temperature control devices (7) are
(Continued)

thermally coupled to the housing (2), and the apparatus has at least one second temperature control device (9), which is configured to dissipate heat, which is output by the first temperature control device (7) to the housing (2), out of the housing (3) to the outside and/or to introduce heat from the outside into the housing (2).

12 Claims, 11 Drawing Sheets

(51) Int. Cl.
*H01M 10/615* (2014.01)
*H01M 10/63* (2014.01)
*H01M 10/647* (2014.01)
*H01M 10/6572* (2014.01)
*H01M 10/0525* (2010.01)
*H01M 10/42* (2006.01)

(52) U.S. Cl.
CPC ....... *H01M 10/613* (2015.04); *H01M 10/615* (2015.04); *H01M 10/63* (2015.04); *H01M 10/647* (2015.04); *H01M 10/6572* (2015.04); *G01N 2223/3103* (2013.01); *G01N 2223/3106* (2013.01); *G01N 2223/611* (2013.01)

(56) References Cited

U.S. PATENT DOCUMENTS

2017/0212062 A1* 7/2017 Chung ............. G01N 23/20033
2019/0074498 A1* 3/2019 Chung ................. H01M 10/62

OTHER PUBLICATIONS

International Search Report and Written Opinion dated Jan. 4, 2019 in corresponding PCT application No. PCT/EP2018/073727.

* cited by examiner

DEVICE FOR CLAMPING AND CONTROLLING THE TEMPERATURE OF PLANAR SAMPLES FOR X-RAY DIFFRACTOMETRY

TECHNICAL FIELD

The invention relates to an apparatus for clamping flat samples, in particular of pouch battery cells for x-ray diffractometry, and for exactly controlling the temperature of said flat samples to a specified target value (heating and cooling). The apparatus comprises a housing having a sample holder, which has holding elements that are able to be tensioned in relation to one another for clamping the sample, at least two x-ray windows for letting in and out x-rays, and at least one first temperature control device for controlling the temperature of the sample. Furthermore, the invention relates to the use of such an apparatus for clamping samples for the non-destructive determination of the state of charge of a battery cell, in particular a pouch battery cell.

BACKGROUND OF THE INVENTION

Lithium-ion batteries and/or lithium-ion rechargeable batteries represent the variant that is presently most widespread for mobile applications among the electrical energy accumulators. Lithium-ion cells are usually used as rechargeable batteries, presently worldwide preferably above all in consumer devices (mobile telephones, cameras, laptops, and motor vehicles), and are characterized by a high specific energy. The pouch cell, also referred to as pouch bag cell, is known as a widespread structural form of a lithium-ion rechargeable battery. In these rechargeable batteries, the stacked or folded active layers are enclosed by a flexible, mostly aluminum-coated polymer film, which is vacuumized at the end of the manufacturing. Here, the cell layers are compressed and fixed, but usually remain flexible. Only the outer terminal electrodes leave the bag-shaped cell envelope. A pouch cell contains all the elements required for a battery, such as cathode, anode, separator, electrolyte, and electrical positive and negative current collectors. The thin outer envelope can easily be penetrated using the x-ray intensity of commercially available x-ray diffractometers.

Knowledge relating to the internal processes during the charge cycles, but also during the discharge, is of decisive significance for the development of high-performance batteries. To study these processes accurately, so-called in-situ examination methods are used, such as x-ray diffractometry, in the case of which statements can be made with the aid of x-rays about the type of the bonding, the crystal structure, and about the type of the existing phases of a sample. The generated x-ray radiation penetrates into the battery sample and is diffracted at the crystal or quasi-crystal structures. By measuring the scattering angles and the intensities of the diffracted beams, a three-dimensional image of the electron density in the crystal can be produced. Both the average positions of the atoms in the crystal and the chemical bonds thereof, the structural disorders thereof, and further pieces of information can be determined from said electron density. Statements can thus be made relating to lattice plane spacing via the Bragg equation. This permits a quantitative determination of the phase components in dependence on the state of charge of the battery material.

In x-ray diffractometry, the x-ray light that is scattered in the sample and exits at the angle $2\theta$ is detected by means of a sensor sensitive to x-ray light, the detector, on the output side. In a (one-dimensional) diffractogram, the measured radiation intensities are plotted over the angle between radiation source, sample, and detector ($2\theta$ angle). Since the spacing of the atomic levels in the anode and cathode materials changes due to the intercalation and deintercalation of the lithium ions during the charging and discharging of a rechargeable battery, such as a lithium-ion battery, the position of the Bragg reflections changes, which can be measured using x-ray diffraction.

However, charge cycles of batteries are also always accompanied by a change of temperature, so that this factor needs to be taken into consideration.

To carry out a meaningful analysis, it is to be ensured, in particular in the case of in-situ examinations, that constant ambient conditions are maintained. In in-operando examinations (charging and discharging of the battery), maintaining a specified TARGET temperature is of great significance for qualitative statements. The charging behavior at real ambient temperatures (summer/winter) is of particular interest in the battery development for electromobility. Temperature control devices that set the battery to a specified TARGET temperature are here of particular significance.

DE 10 2014 211 901 B3 discloses a sample carrier for diffractometric examinations of batteries. The sample carrier is designed as a wheel-type structure and has depressions into which the batteries to be examined are placed. The depression is closed by a lid-type closure, which has a central opening for the beam entry. An opening for the beam exit is located at the bottom of the depression. However, this apparatus is limited to firstly button cell batteries (coin cells). Coin cells are batteries having a solid metal housing that can be penetrated only by highly intensive x-ray radiation (synchrotron radiation) or neutron radiation. The use thereof is thus limited to the few big science institutions worldwide that provide such radiation sources. To perform temperature-dependent measurements of samples, Peltier elements are used in DE 10 2014 211 901 B3. Peltier elements are electrothermal transducers which, based on the Peltier effect, generate a temperature difference as current flows through, which can be used to control the temperature of a component, that is to say for heating and also for cooling. The Peltier elements are arranged between the inner wall of the wheel-type carrier structure and the battery and control the temperature thereof. The heating and cooling arrangement known from DE 10 2014 211 901 B3 acts directly on the batteries to be examined, but the temperature changes of the battery of the charge cycles also act directly on the housing enclosing them, as a result of which it cannot be ensured that the temperature of the battery itself remains constant when cooling by way of the Peltier element. In particular in the case of rechargeable batteries having higher power, maintaining a specified TARGET temperature proves to be difficult.

JP H06 118 039 A discloses a thermal analysis apparatus for samples which has a round sample holder having a double-T shape in cross section. The sample holder comprises upper and lower horizontal sections, which are connected to one another by a vertical connecting section, which is used for holding the sample. The sample is fixed on the vertical connecting section by way of a fixing element. The sample holder is accommodated in a housing laterally having two openings for guiding x-rays through. The upper and lower sides of the sample holder are spaced apart from the inner wall of the housing and form a gas chamber therewith. A heating element is provided in the gas chamber on the outer side of the sample holder.

US 2015/0071409 A1 describes a temperature-controlled chamber for x-ray examinations having a first and a second housing part. The first housing part comprises a sample stage, on the upper side of which a sample is deposited. A temperature control device in the form of a Peltier element is provided below the sample for heating or cooling the sample. The second housing part has a chamber that is open on one side and into which the sample stage of the first housing part is inserted. When the housing parts are connected to one another, the sample stage is placed in the chamber of the second housing part below an x-ray window formed in the chamber wall, through which x-rays pass into the sample. The x-rays are reflected and exit the chamber again through the window.

It is the object of the present invention to provide a possibility by which the state of charge of a battery cell, in particular of a pouch battery cell, can be analyzed while maintaining a specified TARGET temperature.

SUMMARY OF THE INVENTION

The object on which the invention is based is achieved by an apparatus having the features of claim 1 and by the use thereof.

Provision is made according to the invention for each of the holding elements to comprise at least one first temperature control device, which is arranged on or attached to the respective holding element and is connected thereto for thermal transfer. The at least one first temperature control device is thermally coupled to the housing and is connected thereto for thermal transfer. In addition to the first temperature control devices, at least one second temperature control device is provided, which is configured to dissipate heat, which is output by the first temperature control device to the housing, out of the housing to the outside and/or to introduce heat from the outside into the housing. In this way, heat that is generated by the charging of the battery can be transferred from the holding element to the first temperature control device and conducted via the additional heat bridge to the housing into the housing wall, where the second temperature control device can effectively dissipate said heat.

Provision is preferably made for the first temperature control device to be an inner temperature control device with respect to the housing, that is to say the sample holder and the first temperature control device are accommodated in the housing, and the second temperature control device is an outer temperature control device, that is to say it is attached on the outside of the housing and/or at least partially outside in the housing wall.

The term "temperature control" in the context of the invention is to be understood to mean that the first and second temperature control devices are configured to cool or to heat or—depending on the requirements—to cool and to heat.

Using the present invention, it is possible to non-destructively analyze samples at temperatures that are settable in a targeted fashion, and in the case of batteries as the sample, to analyze the properties thereof during the charging and discharging cycles, which is relevant in particular in the field of electromobility. Real usage conditions of batteries can be modulated in a targeted fashion by way of the effective thermal management provided. This contributes to a high quality of the analysis results.

The present invention is conceived such that the sample to be examined is examined in what is referred to as radiographic technology. Findings are thus obtained simultaneously relating to all the components of the sample through which the x-ray beam passes. The apparatus according to the invention is usable unrestrictedly in connection with x-ray diffractometers and is placed between the x-ray emitter (x-ray tube) and the detector in such a manner that the x-rays penetrate in through one x-ray window, penetrate through the sample, and exit again through the other x-ray window to be incident on the detector.

In contrast to the apparatus known from DE 10 2014 211 901 B3, the present invention can also be used on commercially available x-ray diffractometers, as are commonly used and are widespread in industry and research for material analysis. In particular, the present invention takes into account the limited space available in such facilities. Adaptability to all device types on the market is provided in this case. According to a further embodiment of the invention, an alignment device coupled to the apparatus is provided, which is adapted to vary the position of the sample accommodated in the apparatus along the three spatial axes.

According to a further embodiment of the invention, the holding elements are designed in the form of plates that are preferably arranged in parallel. The apparatus is thus suitable in particular for examining flat samples which can be accommodated between the holding elements. This makes the apparatus according to the invention interesting in particular for the analysis of pouch battery cells and in particular for the examination of lithium-ion rechargeable batteries. The plate-shaped configuration of the holding elements provides the largest possible contact surface in this case, which decisively benefits the heat exchange. The thermal contact of uneven samples can be optimized by introducing flexible heat conduction films or pads or other cushions between the sample and the holding plate.

The present invention is not limited to samples in the form of batteries, but rather allows the temperature of any other flat sample to be controlled and simultaneously for said sample to be characterized by way of x-ray radiation. The sample holder is designed such that it can also be used on synchrotron and neutron beam sources. A limiting factor for the thickness of the flat sample is merely the material composition thereof, which still has to be penetrated by the radiation used at the given thickness.

The first temperature control devices are preferably attached to the holding elements on sides of the holding elements that face away from one another. In other words, the holding elements have contact surfaces that face one another for engaging with the sample. At least one first temperature control device is provided on the side of the respective holding element that faces away from the contact surface. The opposite side of the first temperature control device, which faces away from the sample, is in turn thermally coupled to the outer housing to transfer the transported heat thereto. Here, the contact can be direct or take place via a heat transfer element having a high thermal conductivity. The heat transfer element preferably has a higher thermal conductivity than the housing wall.

A further embodiment of the invention furthermore makes provision for the housing to be designed such that its housing wall has at least one opening or one window into which a heat transfer element is placed, wherein the heat transfer element is coupled to the first and the second temperature control device. The heat transport between first and second temperature control devices can thus take place directly. Thus, for example, the first temperature control device can be in contact with the heat transfer element in the housing interior, while a second temperature control device is in contact with the heat transfer element on the exterior.

A preferred embodiment makes provision for one or more Peltier elements to be provided as the first temperature control device. Peltier elements are small in terms of construction and cover a large temperature range with high temperature stability. The heat or cold generated by the Peltier element can be effectively fed to the sample. In the case of cooling, energy is continuously removed from the sample and guided out of the overall system. To this end, the second temperature control device is used according to the invention preferably based on air or water cooling.

According to a further embodiment, provision is made for the inner sample holding elements to have a high thermal conductivity. In particular, a thermal conductivity of at least 200 W/(m·K) can be considered to be a high thermal conductivity. The temperature is thus quickly and uniformly distributed over the entire sample surface, and a temperature gradient is minimized. The holding elements are preferably metal plates, for example, made of aluminum. The housing or at least the housing wall in the region of the first and second temperature control devices is preferably also made of metal.

According to a further embodiment of the invention, the holding elements are spring pre-tensioned, or means for the tensioning of the holding elements in relation to one another are provided. In this way, the holding elements integrate the functions "heat exchange with the sample" and "fixing the sample in the housing" in an advantageous manner. Additional separate fixing means can be dispensed with and the housing can have a compact design. In this way, the sample can be placed arbitrarily within the two holding elements, with the result that different positions of the sample can be analyzed.

A further embodiment makes provision for the sample holder to be fastened in the housing with heat decoupling elements, with the result that no direct heat transfer between the sample holder and the housing takes place but that heat is transferred only via the first temperature control device. To this end, the sample holder can be fastened in the housing by way of screws, which are underlaid with ceramic washers and guided in ceramic sleeves, to prevent a heat bridge between the outer housing and the inner sample holder.

In general, the sample holder can be configured as an inner housing which is accommodated in the outer housing, wherein the first temperature control device is coupled to the outer housing and the second temperature control device can remove or introduce heat from or into the housing.

An air gap or a free space between the sample holder (inner housing) and the inner housing wall of the outer housing can furthermore help minimize the direct heat transfer between the housing and the sample holder and concentrate it on the first temperature control device. Other suitable heat decoupling elements and/or heat decoupling measures between the sample holder and the housing are, of course, also possible.

According to a further embodiment of the invention, the apparatus comprises a plurality of second temperature control devices, which are preferably provided on and/or in the housing wall of the outer housing.

The second temperature control devices can be provided on and/or in the outer housing wall or the outer housing in terms of space such that they are each assigned to one of the first temperature control devices, that is to say are located directly opposite. In each case at least one second temperature control device is here arranged in the thermal coupling region between a first temperature control device and the outer housing. That means that a second temperature control device is placed in the region in which a first temperature control device is in heat-transfer contact with the housing wall. In other words, a first temperature control device and a second temperature control device can be positioned such that the first and the second temperature control device are assigned to a common housing wall section and are separated from one another by way of the common housing wall section. As a result, a first and a second temperature control device are arranged such that their respective heat transport or heat exchange primarily takes place via the common housing wall section. The second temperature control device can effectively support the first temperature control devices if the latter must supply or dissipate a large quantity of heat to or from the sample.

According to a further embodiment of the invention, the second temperature control device comprises active and/or passive means for supplying and/or dissipating heat into the housing wall. Cooling ribs, radiators, or similar means are possible means for passive cooling, which may be based for example on free convection. For active temperature control, the thermal energy can be transported using a fan or a liquid pump. Thus, the housing wall can have temperature control lines or ducts through which a temperature medium, such as water or gas, flows. Said second temperature control devices can be incorporated into a temperature control circuit, for example a cooling water circuit. A plurality of second temperature control devices can be connected in each case to a dedicated temperature control circuit. According to a further embodiment, however, provision is made for a plurality of second temperature control devices to be connected to a common temperature control circuit. The second temperature control devices can be attached to the housing on the outside or be at least partially integrated in the housing wall.

A further embodiment of the invention makes provision for combinations of active and passive temperature control for the second temperature control device. For example, active/passive air temperature control can thus be implemented by the use of a fan in combination with cooling ribs.

The apparatus according to the invention can operate without cryogens (cryogenic liquids or gases) or other special coolants. Rather, water (for example in the form of a water circuit) may simply be used in the second temperature control device. The thermoelectric effect of so-called Peltier elements is used in the apparatus. Studies have shown that the invention allows three physical processes to run simultaneously.

1. Controlling the temperature of flat samples to a specified target value in the range of −40° C. to +60° C. Implemented by a first (inner) temperature control device based on Peltier elements. Supply and dissipation of thermal energy implemented by a second (outer) temperature control device based on air or water cooling.
2. In the case of electrically active samples, such as batteries, cyclizing (in operando) current and voltage (charging/discharging) while simultaneously recording all electrical parameters such as charge transport, capacitance, internal resistance, current, voltage etc., implemented by a connection option to for example bipotentiostats.
3. Non-destructive material analysis by way of x-ray diffraction (in situ) implemented by way of an entry and an exit window for the x-ray radiation, and holding of the sample by bracing elements and alignment option.

According to a further embodiment of the invention, a temperature monitoring device is provided, which is operatively connected to the first temperature control devices and/or the at least one second temperature control device and is configured to set a temperature of the sample by open-loop/closed-loop control of the first temperature control devices and/or second temperature control device. The ACTUAL temperature of the sample may be used in principle as the measurement element.

A further embodiment of the invention makes provision for the second temperature control device to have means for active and/or passive air temperature control and for the temperature monitoring device to be configured such that the closed-loop control (regulation) of the temperature of the sample to a TARGET value can be realized by the closed-loop control of the first temperature control device, for example by the closed-loop control of the current or voltage supply of a power supply unit for Peltier elements. For the air-cooled design, a temperature sensor is used to feed the ACTUAL temperature of the sample back to a temperature regulator in the form of a feedback signal, and said feedback signal is then used for the closed-loop control of a power supply unit of the first temperature control devices. Thus, the temperature of the sample is set by the closed-loop control of the voltage of the Peltier elements (actuator). The second temperature control device is preferably attached to the outside of the housing wall.

For the measurement and closed-loop control of the temperature of the sample, a further embodiment of the invention makes provision for a temperature sensor (thermocouple) to be provided on one of the holding elements in a corresponding cutout and for the thermocouple to be fed through an opening, which is provided for this purpose, out of the housing. In this way, the temperature sensor can be placed immediately on the sample surface.

A further embodiment of the invention makes provision for the second temperature control device to comprise liquid temperature control, for example water, and for the temperature monitoring device to be configured such that the closed-loop control of the temperature of the sample to a TARGET value can be realized by the closed-loop control of the temperature of the temperature control liquid. In this case, the first temperature control device is preferably operated at constant voltage and is not controlled by closed-loop control. In the liquid-cooled design, the ACTUAL temperature of the sample, which is measured by a sensor, is fed back to a temperature regulator, which acts as an actuator on the cooling water supply. It is possible, for example, using the temperature regulator to adapt the cooling water temperature.

A further embodiment of the invention makes provision for the housing, or the aforementioned outer housing, in which the sample holder is accommodated, to be able to be hermetically sealed with respect to the environment. A connection for introducing working gas or at least one inlet and at least one outlet for feeding through working gas is/are preferably provided. For example, nitrogen can prevent the formation of condensed water or ice at low temperatures when performing an examination in the housing interior. For sealing off the housing, the x-ray windows can be sealed off using a material that is transparent for x-rays. A suitable film is known under the trademark "Kapton" by E. I. du Pont de Nemours and Company (DuPont, for short), USA.

A further embodiment of the invention makes provision for openings in the hermetic housing wall to be provided for feeding through electrical connections for active electronic samples, such as batteries.

According to a further embodiment of the invention, cutouts for guiding through the x-ray beam are provided in or on the holding elements, analogous to the x-ray windows. These, too, can be sealed off using a material that is transparent for x-rays. Of course, the holding elements can also be assembled in each case from a plurality of individual elements, which are arranged spaced apart from one another and form a cutout for guiding through the x-ray beam.

DESCRIPTION OF THE FIGURES

The present invention will be explained in more detail below with reference to merely preferred exemplary embodiments and the drawings. In the figures:

FIGS. 1 to 6 show the setup and, schematically, the operation of an apparatus according to the invention in accordance with a first embodiment of the invention on the basis of different illustrations. FIG. 2 here schematically shows the arrangement of the components in a sectional view of an exploded illustration. FIG. 6 schematically shows the heat exchange during operation of the apparatus. The heat exchange is marked by way of arrows.

Figure 1A:
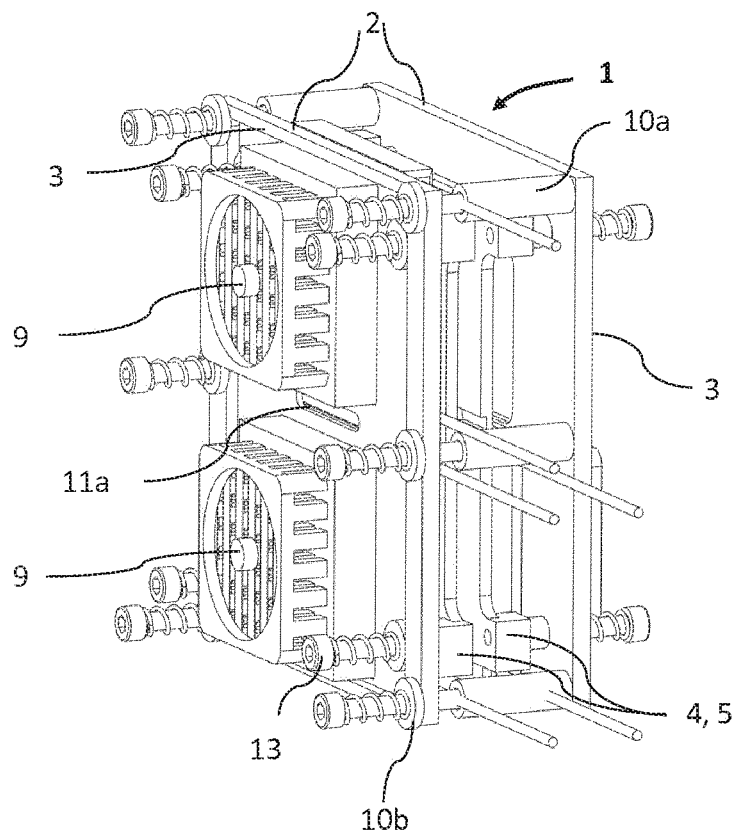
FIGS. 1a,b depict an apparatus according to a first embodiment of the invention.
Figure 1B:
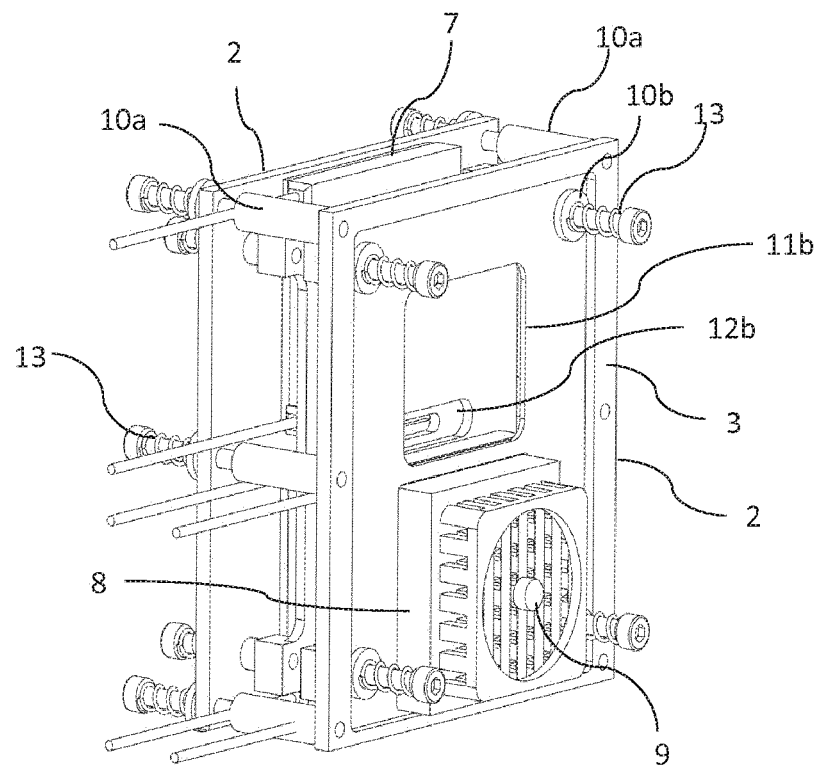

The apparatus 1 for x-ray examinations that is illustrated in FIGS. 1a, 1b serves for controlling the temperature of flat samples. To allow the view of the internal structure, a hermetic enclosure, which the apparatus otherwise has, was omitted. The apparatus 1 comprises a housing 2, of which here only two front and rear walls 3 of the housing are illustrated. A sample holder 4 is arranged in the interior of the housing 2. Said sample holder 4 comprises two plate-type holding elements 5 for holding a flat sample 6 that is arranged therebetween, as is shown in the sectional view in an exploded illustration in FIG. 2. In the case of a lithium-ion battery, said battery is present in the form of what is known as a pouch cell. The pouch-bag structural form makes it possible for the outer sides of the pouch cell to press flat against the contact surfaces of the plate-type holding elements 5 that face one another, so that a large heat transfer surface is ensured.

Figure 3:
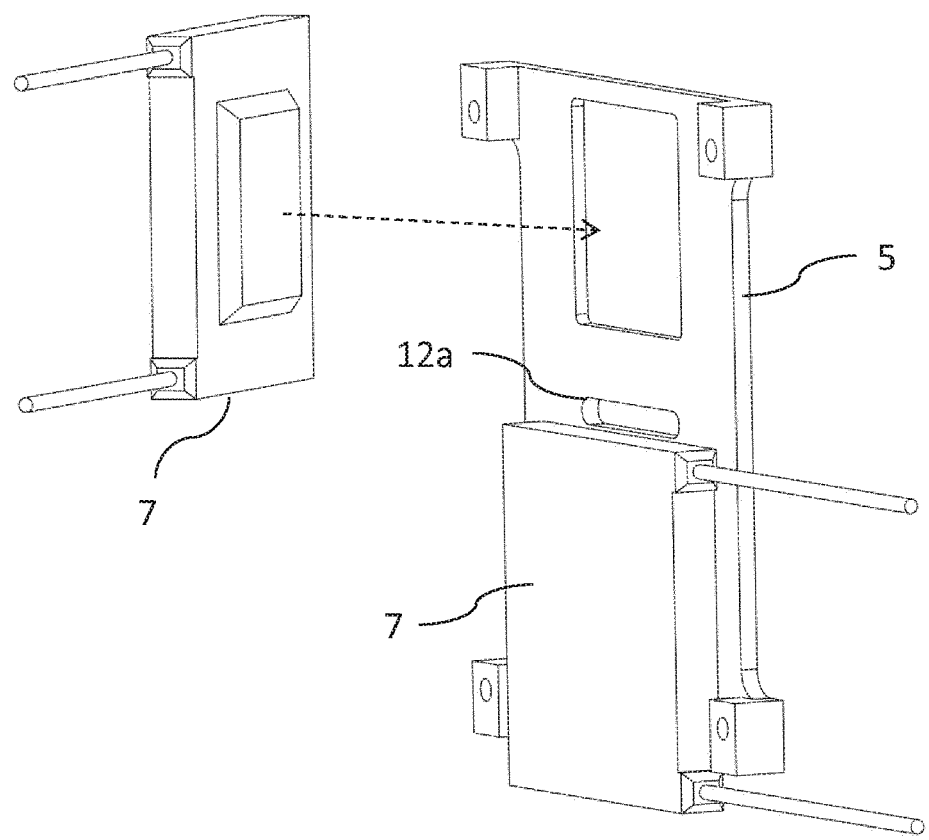
FIG. 3 depicts holding elements and first temperature control devices in the form of cascaded Peltier elements of the apparatus from FIG. 1.

The plate-type holding elements 5 consist of aluminum and have a high thermal conductivity. Due to the direct contact with the pouch cell, they are thermally coupled thereto. First temperature control devices 7 in the form of cascaded Peltier elements are attached to the side of the holding elements 5 that face away from the contact surface and are in direct heat transfer contact with the holding elements. FIG. 3 in this regard shows how one of the first temperature control devices is mounted on one of the two sample holding elements 5. Depressions in the holding elements 5 serve to accommodate the Peltier elements 7 and to minimize the remaining wall thickness of the holding element for a good heat transfer to the sample.

Figure 2:
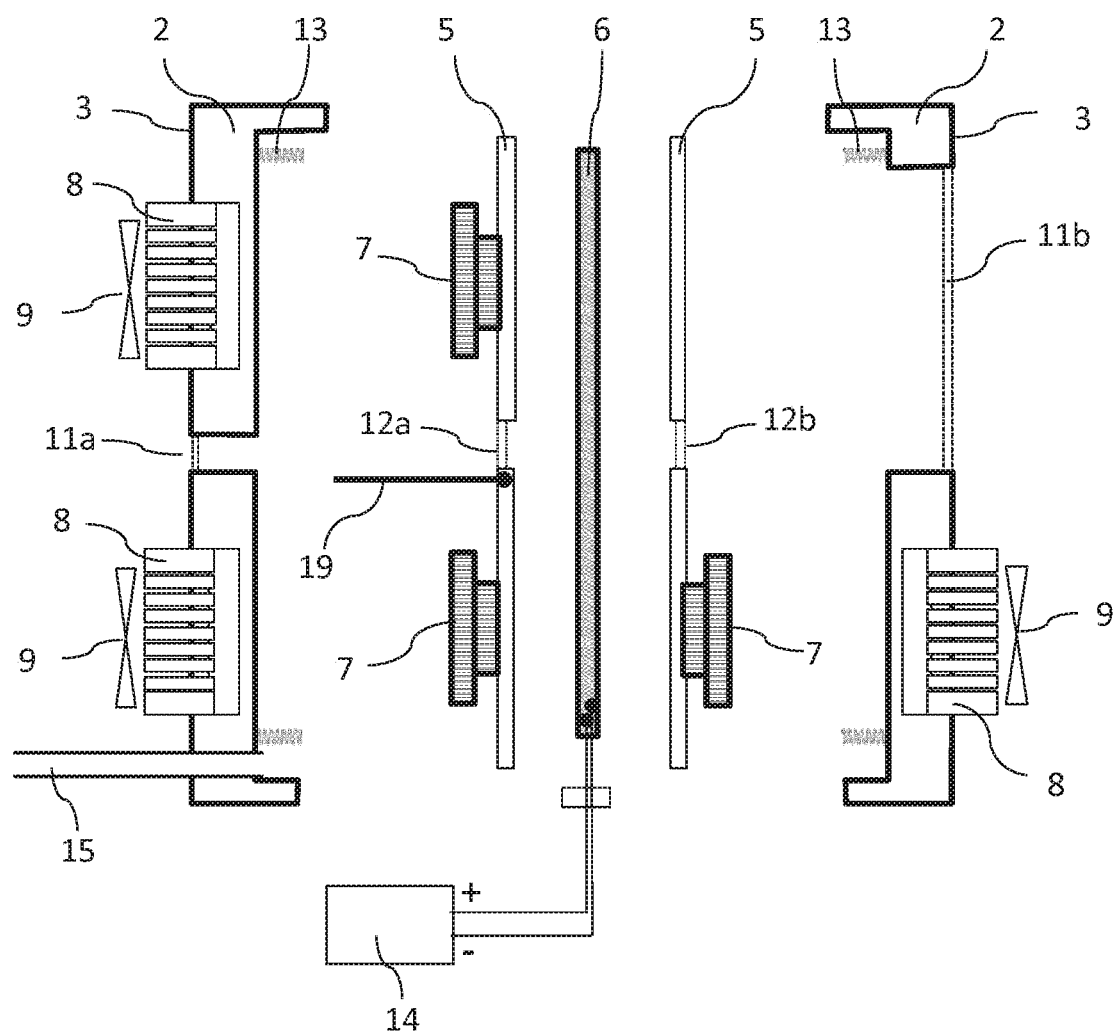
FIG. 2 depicts a schematic illustration of the apparatus from FIG. 1 in a sectional exploded view.
Figure 5:
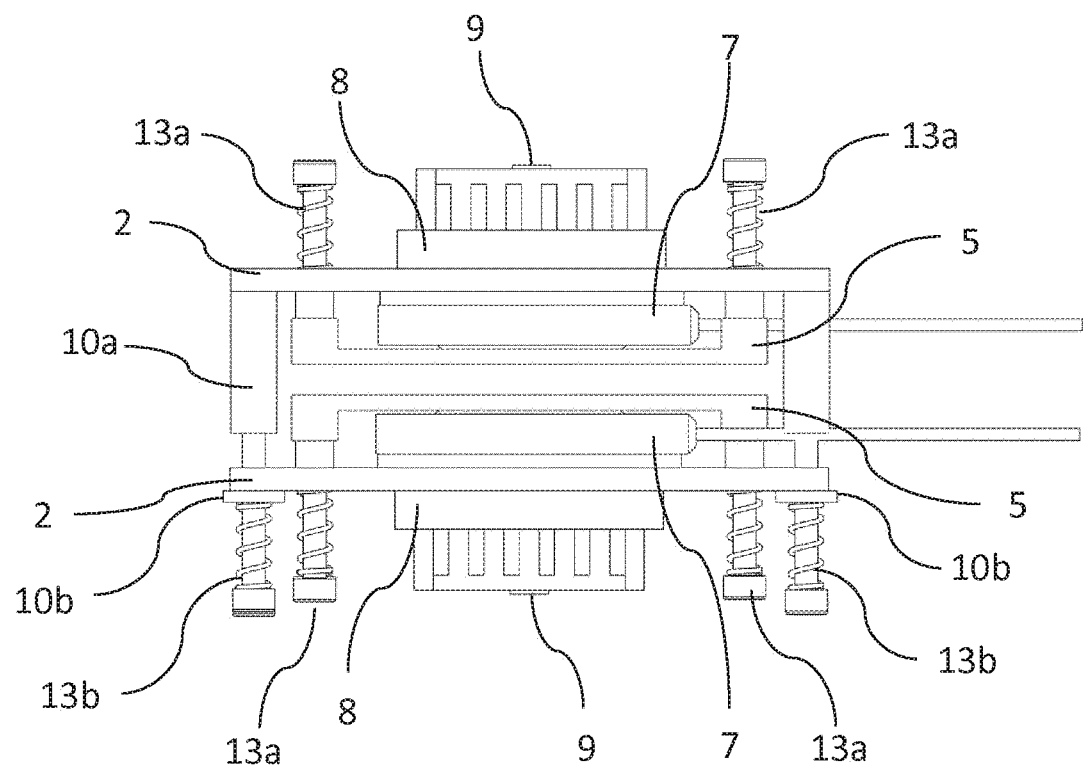
FIG. 5 depicts a sectional view of the apparatus from FIG. 1.

As is evident in the schematic view in FIG. 2, the holding elements 5 can be tensioned in relation to one another via tensioning elements, such as springs, to hold the sample 6 between them. FIGS. 1 and 5 illustrate these tensioning elements in the form of spring pre-tensioned screws 13, which are guided in the outer housing.

On the outer side of the housing 2 (FIGS. 1a, 1b, 2, 5), second temperature control devices 9 in the form of combined fan/cooling rib units for dissipating heat out of the housing wall 3 are attached in front of the first temperature control devices 7 in a direction proceeding from the housing wall 3 in the direction of the sample 6 or the sample holder 4. These second temperature control devices 9 are in each case placed in the thermal coupling region between a first temperature control device 7 and the housing wall 3. Except for the first temperature control devices 7, the sample holder 4 is thermally decoupled from the housing wall 3 and is to this end fastened in the housing via screws guided in ceramic sleeves 10a and via ceramic washers 10b. The direct heat transfer from the battery to the housing thus primarily takes place via the first temperature control devices 7.

Figure 4:
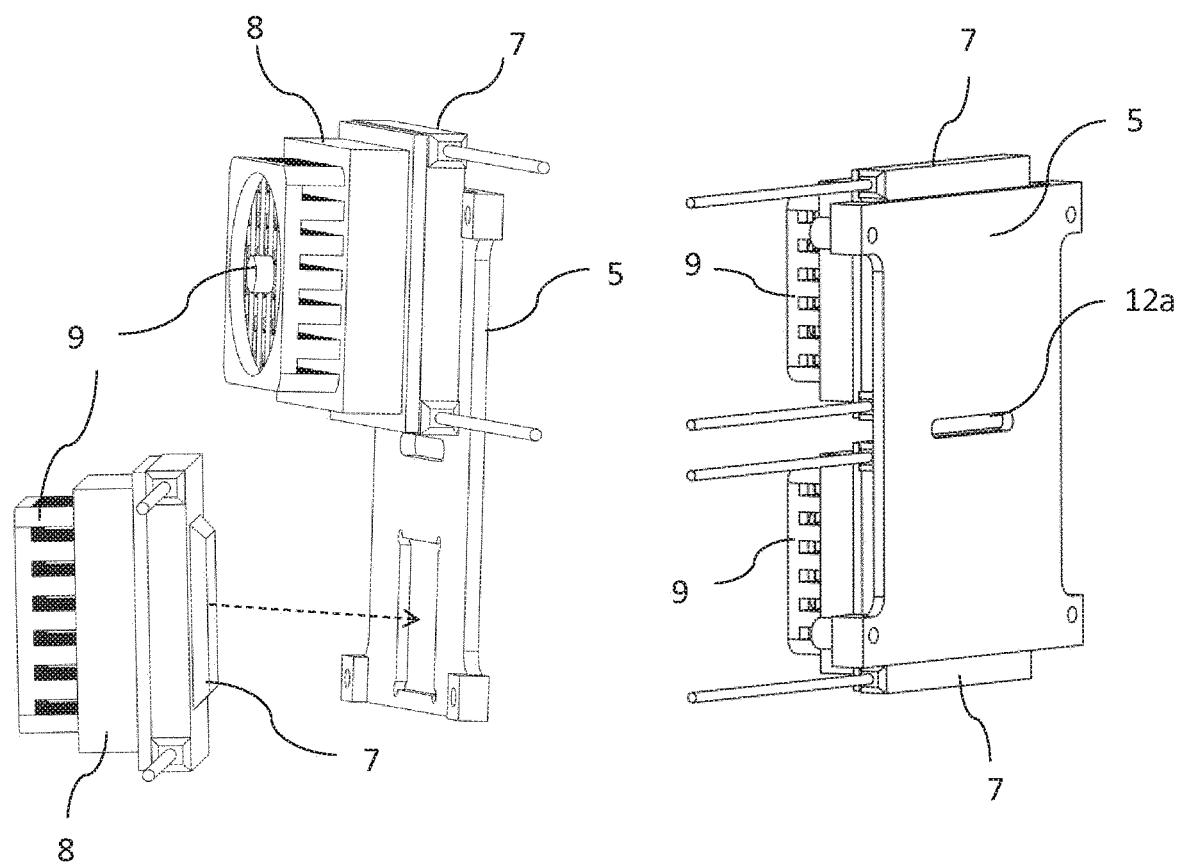
FIG. 4 depicts components of the apparatus from FIG. 1.

As is evident from FIG. 4, the Peltier elements 7 are thermally coupled on the side of the first temperature control devices that faces away from the holding elements 5 to the second temperature control device 9 to ensure a high degree of heat transfer. In principle, the Peltier element can be placed directly on the inner housing wall 3, and the second temperature control device 9 can be placed on the outside of the housing. In the present case, however, the housing comprises a heat transfer element 8, which is placed into an opening or a window in the housing wall 3 and ensures improved heat transfer between the first and second temperature control devices 7, 9, since the heat transfer element 8 is in contact with the first temperature control device 7 on the housing inside and with the second temperature control device 9 on the housing outside.

FIG. 5 shows the placement of the second temperature control devices 9 directly opposite the first temperature control devices 7.

In a central section of the housing 2, x-ray windows 11a, 11b are formed on opposite sides of the housing wall 3 (FIGS. 1a, 1b, and 2). These x-ray windows are used for guiding through an x-ray beam, which penetrates through the first x-ray window 11a into the housing 2, penetrates through the sample 6, and exits from the larger second x-ray window 11b to subsequently be incident on a detector. For guiding the x-ray beam through the holding elements 5, the latter have through-cutouts 12a and 12b in a central section.

The holding elements 5 and the inner housing wall 3 and also the mutually opposing housing walls 3 are connected to one another via tensioning elements 13 in the form of spring pre-tensioned screws (see FIG. 5). The Peltier elements are pressed on the housing wall in the direction of the sample by the spring force tensioning force of the tensioning elements (spring elements) 13. By energizing the Peltier elements, a temperature difference arises between two sides of the Peltier element which can be effectively used for cooling or heating the sample or the holding element. In the setup shown here, the Peltier elements are in contact, by way of their cold side, with the holding elements. Electrical connections of a battery as the sample 6 are guided in a sealed state out of the housing 2 and connected to a bipotentiostat 14 (FIG. 2) to charge or discharge the battery. Electrical connections for energizing the Peltier elements are also guided in a sealed state out of the housing, but are not shown.

A polyamide film, which has a high thermal stability and a high transmissivity for x-rays (for example, Kapton film) is adhesively bonded over the x-ray windows 11a, 11b and the cutouts 12a, 12b.

The housing 2 is hermetically sealed with respect to the environment but also has additional connections 15 (FIG. 2) for supplying or discharging working gas, such as a nitrogen flush. The inner space of the housing 3 can thus be flushed with nitrogen gas to prevent the formation of condensed water and/or ice at low temperatures.

By energizing the Peltier elements, they cool the holding elements and transfer the absorbed heat on the other side of the Peltier element to the housing wall. The cooling of the housing wall by means of the second temperature control device has the result that the efficiency of the Peltier element also increases.

Figure 6:
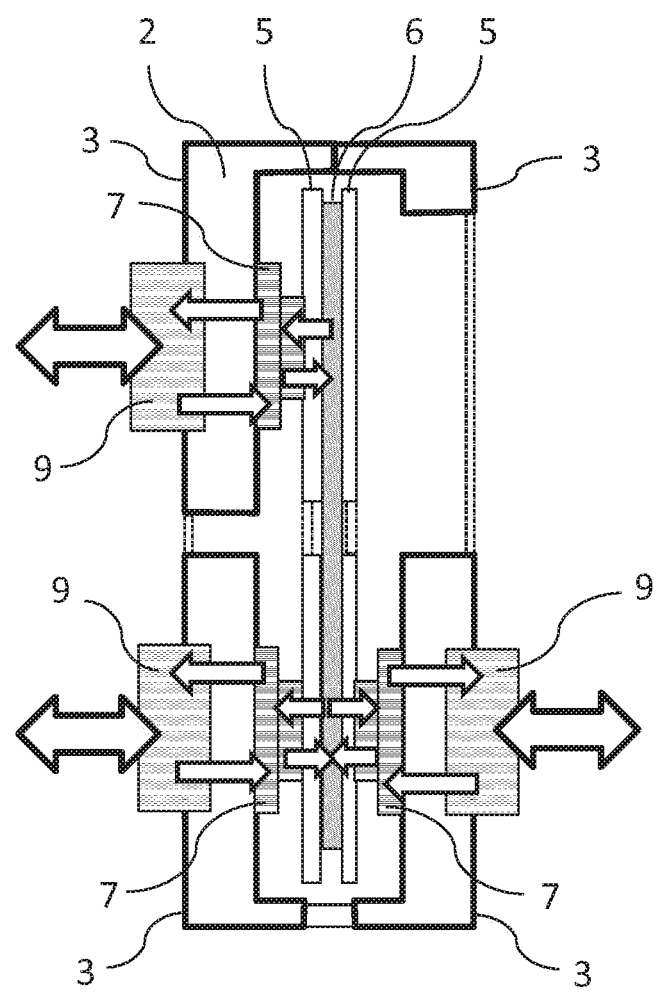
FIG. 6 schematically illustrates the flow of energy of the apparatus from FIG. 1.
Figure 7:
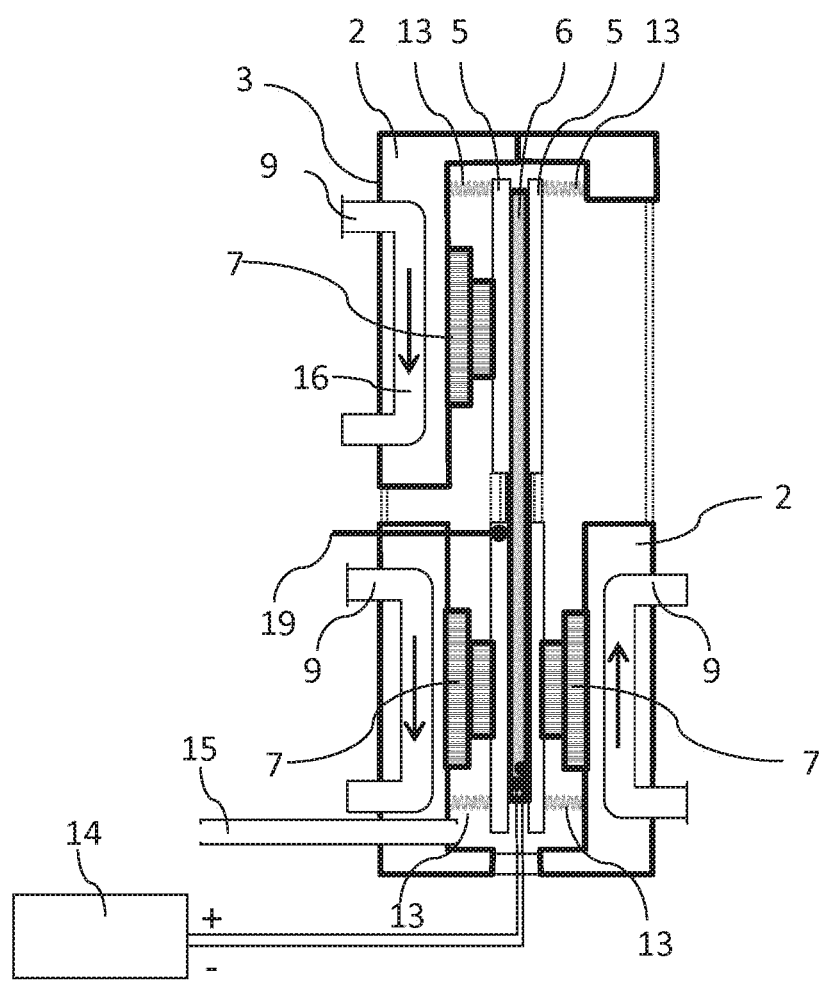
FIG. 7 schematically illustrates an apparatus according to a further embodiment of the invention in a sectional view.
Figure 8:
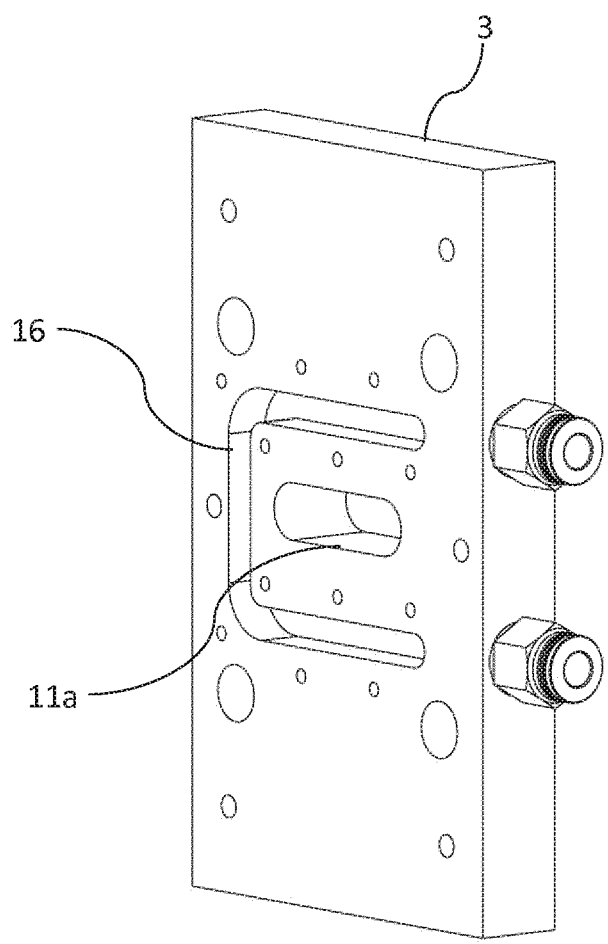
FIG. 8 depicts a housing part of the apparatus from FIG. 7 with introduced cooling liquid duct.

FIG. 6 schematically shows the transport of thermal energy in the form of arrows from/to the sample 6 via the holding plates 5 and first temperature control device 7 from/to the outer housing 2 and here via the second temperature control device 9 to the environment outside.

Figure 9:
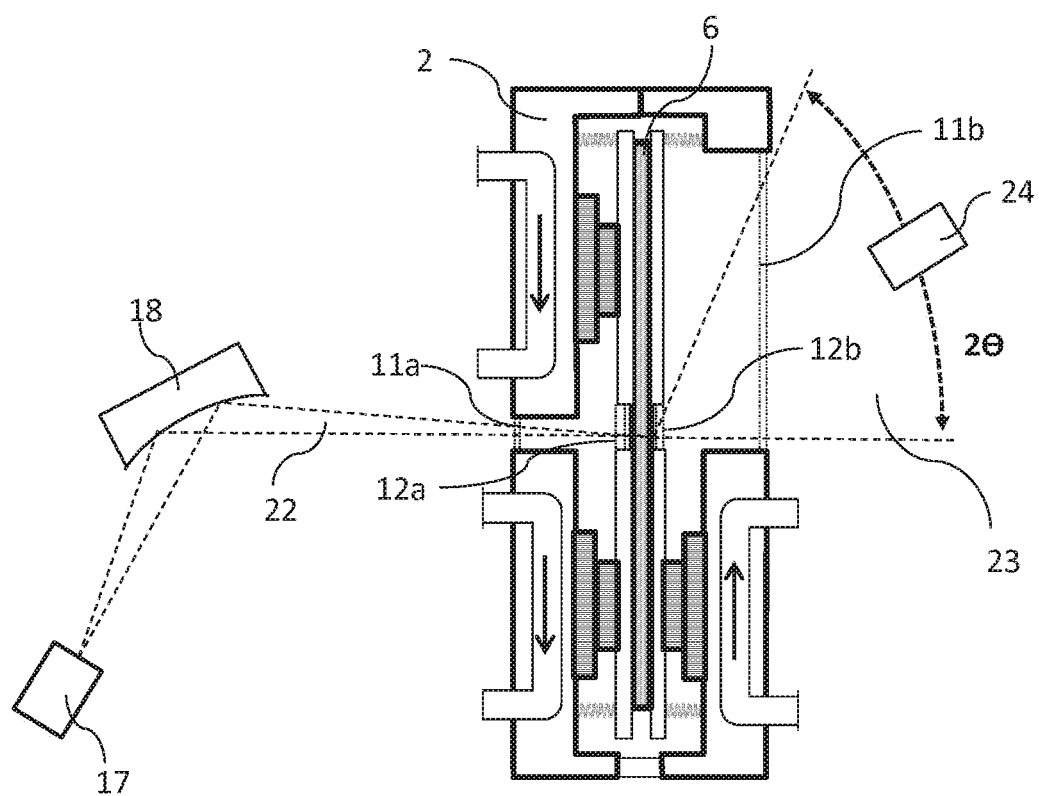
FIG. 9 schematically illustrates the passage of the x-ray radiation through the apparatus from FIG. 7.
Figure 10:
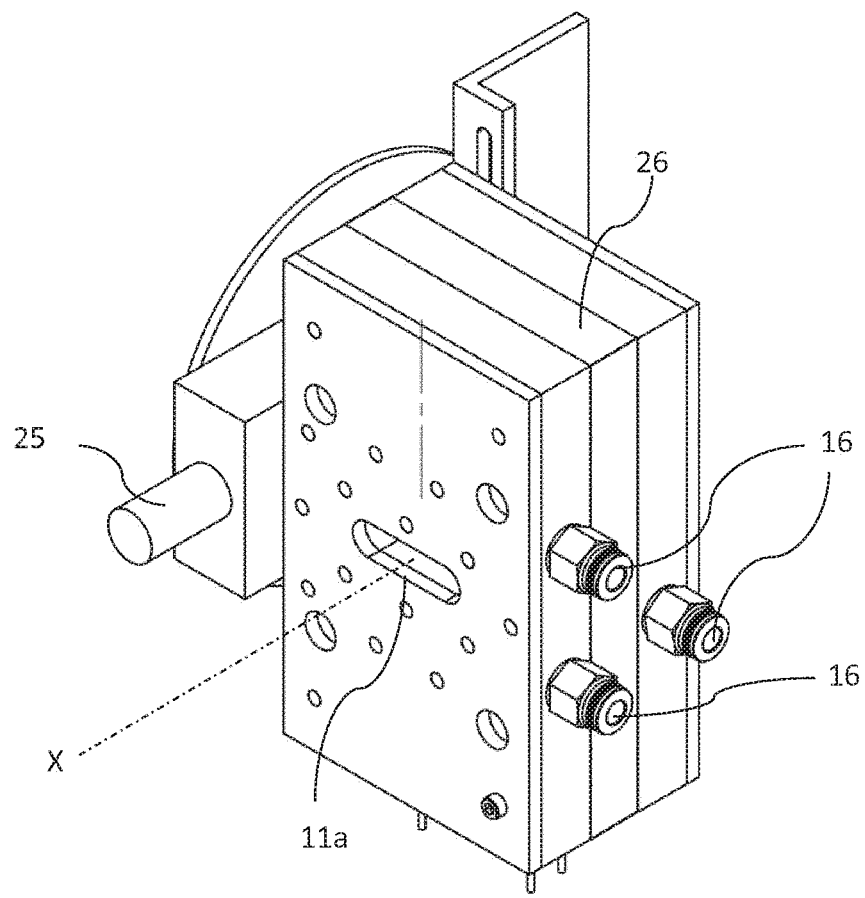
FIG. 10 shows the apparatus from FIG. 7 with a hermetic housing seal and a linear stage for sample alignment.

The further embodiment shown in FIGS. 7 to 10 differs from the first embodiment in that the second temperature control device 9 is designed in the form of a liquid temperature control device. To this end, temperature control liquid ducts 16 are installed in the housing wall 3 (see FIG. 8). In principle, however, these can also be attached in the form of lines to the outside of the housing 3. The second temperature control devices 9 are connected to a common cooling liquid circuit (not illustrated). FIG. 10 depicts this embodiment in a closed form having a hermetic side cover 26 and an attached linear drive 25 for aligning the entire apparatus including the sample in the x-direction with respect to the x-ray beam. This alignment device is utilizable for both described embodiments.

FIG. 9 schematically illustrates an examination setup for an x-ray diffractometry analysis of a flat sample. For this purpose, the apparatus 1 is mounted in an x-ray diffractometer between x-ray beam emitter (x-ray tube) and a detector.

As is illustrated in FIG. 9, the x-rays are emitted by an x-ray tube 17 and are incident on a focusing x-ray optical unit 18. After deflection of the x-ray beam, it penetrates the housing 2 via the first x-ray window 11a, penetrates through the first cutout 12a and subsequently the sample 6. The crystal atoms in the sample cause incident x-rays to be diffracted into different, characterizing directions. After penetrating through the sample, the x-ray beams exit the holding elements through the second cutout 12b, leave the housing through the second x-ray window 11b, and are incident on a detector 24 to produce a diffraction pattern.

The x-ray light that is scattered in the sample and exits at the angle $2\theta$ is detected on the output side in the detector 24 by way of a sensor that is sensitive to x-ray light. In a (one-dimensional) diffractogram, the measured radiation intensities are plotted over the angle between radiation source, sample, and detector ($2\theta$ angle). The sample itself is not moved during the measurement. In the case of batteries as the sample, the scattering peaks in the diffractogram, which originate from the passive components installed in the battery, such as a copper anode or aluminum enclosure, are used to correctly align the battery in the beam direction. To this end, the apparatus 1 mounted on a linear stage 25 is moved with the mounted battery in the longitudinal direction until said reference peaks are located at the theoretically correct position.

Subsequently, various operating variants can be examined, wherein the first and second temperature control devices maintain the temperature of the sample at a predetermined and constant level.

Figure 11:
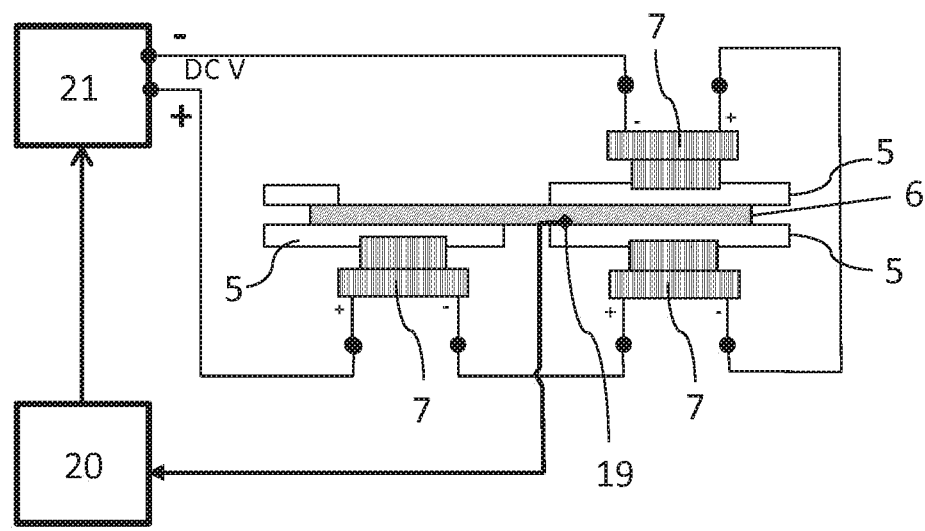
FIG. 11 schematically illustrates the control loop for controlling the temperature of a sample in the apparatus from FIG. 1.

FIG. 11 schematically illustrates the control loop for an air-cooled design in the temperature control of the sample 6. The control loop is part of a temperature monitoring device, which is operatively connected to the first temperature control devices 7 and is configured to set a temperature of the sample 6 to a TARGET value by closed-loop control of the first temperature control devices 7 (Peltier elements).

A temperature sensor 19, which is connected to the sample 6, measures the temperature of the sample 6. The temperature signal (measurement element) is fed back as an ACTUAL signal to a temperature regulator, which controls a regulatable power supply unit 21 as an actuator, which supplies the first temperature control devices 7 with voltage, taking into account the TARGET temperature. By reversing the polarity of the Peltier elements, the latter can be switched to heating operation.

Figure 12:
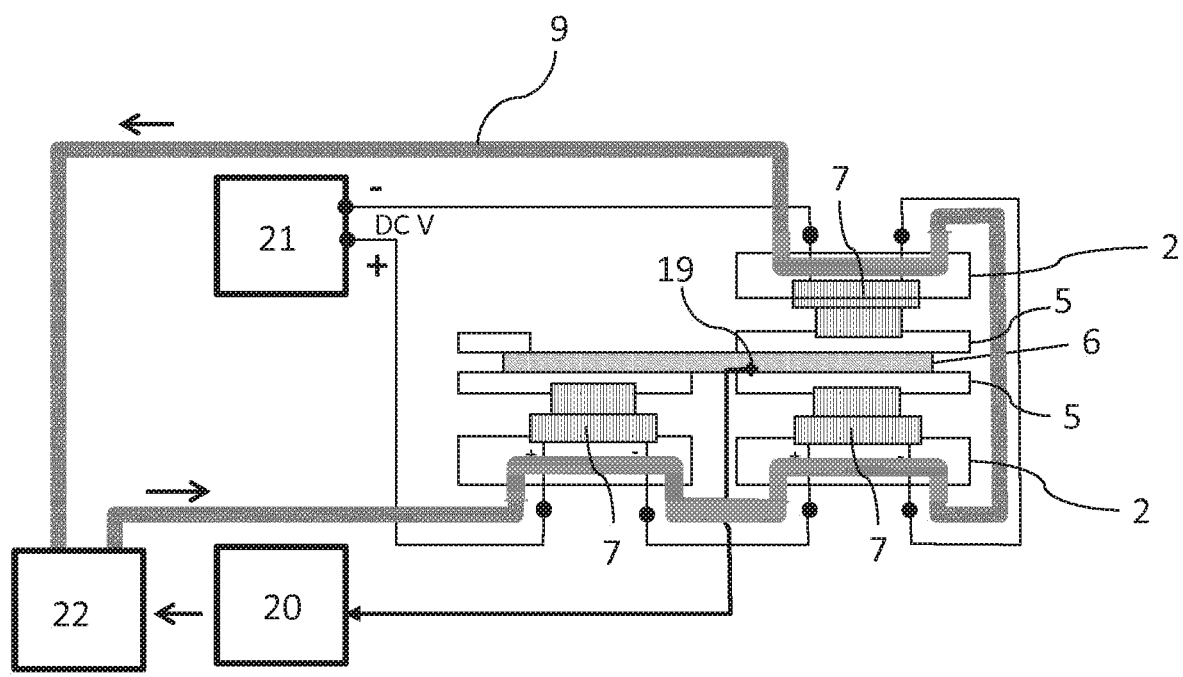
FIG. 12 schematically illustrates the control loop for controlling the temperature of a sample in the apparatus from FIG. 7.

FIG. 12 schematically illustrates the control loop for a liquid-cooled design for controlling the temperature of the sample 6. Here too, the control loop is part of a temperature monitoring device, which is operatively connected to the second temperature control devices 9 in the form of liquid cooling (see FIG. 7) and is configured to set a temperature of the sample 6 to a TARGET value by closed-loop control of the second temperature control device 9. The closed-loop control is realized by setting the flow temperature of the cooling water.

A temperature sensor 19, which is connected to the sample 6, measures the temperature of the sample 6. The temperature signal (measurement element) is fed back as an ACTUAL signal to a temperature regulator 20, which controls the cooling water supply (actuator) 22 taking into account the TARGET temperature. The power supply unit 21 is supplied with constant voltage. The first temperature control devices 7 are installed in a series connection and are operated with constant power. In principle, the second temperature control device shown in FIG. 12 can also be switched over to heating operation.

LIST OF REFERENCE SIGNS

1 Apparatus for x-ray examinations
2 Housing
3 Housing wall
4 Sample holder
5 Holding element
6 Sample (lithium-ion rechargeable battery)
7 First temperature control device
8 Heat transfer element
9 Second temperature control device
10a Ceramic sleeve
10b Ceramic washer
11a,b X-ray window
12a,b Cutout
13 Tensioning elements
14 Bipotentiostat
15 Working gas connection
16 Temperature control liquid duct
17 X-ray tube
18 Focusing optical unit
19 Temperature sensor
20 Temperature regulator
21 Power supply unit
22 Entering x-ray beam
23 Exiting x-ray beam
24 X-ray detector
25 Linear drive
26 Hermetic housing seal

The invention claimed is:

1. An apparatus for clamping flat samples, in particular pouch battery cells, for x-ray diffractometry, with the apparatus having
   a housing having a sample holder, which has holding elements for clamping the sample, wherein cutouts for guiding through the x-ray beam are provided in each case in the holding elements,
   at least two x-ray windows for letting in and out x-rays, and
   at least one first temperature control device for controlling the temperature of the sample,
   with the first temperature control device being thermally coupled to the housing, and
   with the apparatus having at least one second temperature control device, which is configured to dissipate heat, which is output by the first temperature control device to the housing, out of the housing to the outside and/or to introduce heat from the outside into the housing,
   wherein the holding elements have a plate-shaped configuration and contact surfaces that face one another for clamping the sample, with in each case at least one first temperature control device being attached to the side of the holding element that faces away from the respective contact surface, and with a spring mechanism being provided for the tensioning of the holding elements in relation to one another.

2. The apparatus as claimed in claim 1, wherein the holding elements are designed in the form of plates that are arranged in parallel.

3. The apparatus as claimed in claim 1, wherein the sample holder is fastened in the housing using heat decoupling elements.

4. The apparatus as claimed in claim 1, wherein the second temperature control device comprises active and/or passive means for supplying and/or dissipating heat out of and/or into the housing wall.

5. The apparatus as claimed in claim 1, further comprising a temperature monitoring device, which is operatively connected to the first and/or the second temperature control devices and is configured to set a temperature of the sample by open-loop or closed-loop control of the first and/or second temperature control device.

6. The apparatus as claimed in claim 5, wherein
   a) the second temperature control device comprises means for active and/or passive air temperature control and the temperature monitoring device is configured such that the closed-loop control of the temperature of the sample can be realized by the closed-loop control of the energy supply of the first temperature control device; and/or
   b) the second temperature control device comprises liquid temperature control, and the temperature monitoring device is configured such that the closed-loop control of the temperature of the sample can be realized by the closed-loop control of the temperature of the temperature control liquid, with the first temperature control device being preferably operated with constant voltage.

7. The apparatus as claimed in claim 1, wherein a plurality of second temperature control devices is provided on and/or in the housing wall, with at least one second temperature control device being arranged in each case in the thermal coupling region between a first temperature control device and the housing.

8. The apparatus as claimed in claim 1, wherein the first temperature control device comprises at least one Peltier element.

9. The apparatus as claimed in claim 8, wherein the first temperature control device comprises a plurality of Peltier elements being connected in series.

10. The apparatus as claimed in claim 1, wherein the housing is able to be hermetically sealed with respect to the environment and has at least one connection for introducing working gas into the housing.

11. The apparatus as claimed in claim 1, wherein it is configured such that the temperature control devices operate without cryogenic refrigerants.

12. A pouch battery cell clamped by the apparatus as claimed in claim 1, for x-ray diffractometry.

\* \* \* \* \*